United States Patent [19]
Ross

[11] 3,876,893
[45] Apr. 8, 1975

[54] STATOR WINDING SUPPORT STRUCTURE FOR DYNAMO-ELECTRIC MACHINES PROVIDED WITH A SUPERCONDUCTING ROTOR WINDING

[75] Inventor: John S. H. Ross, Northumberland, England

[73] Assignee: BBC Brown Boveri & Company Limited, Baden, Switzerland

[22] Filed: Nov. 29, 1973

[21] Appl. No.: 419,930

[30] Foreign Application Priority Data
Dec. 18, 1972 Switzerland.................... 18271/72

[52] U.S. Cl. .............................................. 310/258
[51] Int. Cl. .............................................. H02k 1/12
[58] Field of Search ............ 310/64, 10, 40, 52, 54, 310/57, 59, 51 AQ, 192, 216, 217, 218, 254, 258, 259, 194

[56] References Cited
UNITED STATES PATENTS

| | | | |
|---|---|---|---|
| 2,199,141 | 4/1940 | Rice.................................. | 310/258 |
| 2,199,156 | 4/1940 | Grobel............................... | 310/258 |
| 2,199,351 | 4/1940 | Taylor............................... | 310/258 |
| 2,342,502 | 2/1944 | Taylor............................... | 310/258 |
| 3,461,330 | 8/1969 | MacDougal........................ | 310/59 |
| 3,531,667 | 9/1970 | Barton.............................. | 310/258 |
| 3,708,707 | 1/1973 | Krantz.............................. | 310/258 |
| 3,745,389 | 7/1973 | Lorch............................... | 310/52 |

Primary Examiner—R. Skudy
Attorney, Agent, or Firm—Pierce, Scheffler & Parker

[57] ABSTRACT

A stator winding support structure for a dynamo-electric machine particularly adapted for a machine of the type provided with a superconducting rotor winding includes an annular support on which conductor bars forming the stator winding are mounted. The annular support is located within the stator core and spaced radially therefrom to establish a circumferentially extending gap therebetween and this gap is filled out by a circumferentially extending array of wedge means incorporating elastically compressible inserts so as to establish a radially resilient mounting for the annular winding support that provides for a predetermined expansion limit.

7 Claims, 2 Drawing Figures

STATOR WINDING SUPPORT STRUCTURE FOR DYNAMO-ELECTRIC MACHINES PROVIDED WITH A SUPERCONDUCTING ROTOR WINDING

The present invention relates to an improvement in a stator winding support structure for a dynamo-electric machine and particularly a machine of this type which is provided with a superconducting rotor winding.

In the case of three-phase machines such as generators, particularly those with superconducting rotor windings, the attainment of high specific powers per unit volume is to a large degree governed by the construction of the stator. In normal operation, the stator is subjected to a cyclic mechanical stress, and the principal criterion consists in keeping the associated vibrations to an acceptable value. Especially in the event of short-circuit stresses it is necessary to ensure that the stator suffers no damage and that as far as possible operation is not interrupted. The forces applied in such cases are also of a cyclic nature, and act mainly in the radial direction.

Since the stator windings are normally surrounded by an iron core, the support for the winding is located on the iron core and the electromagnetic forces are transferred to this core.

With smaller machines of this kind, the winding is fixed by mounting it directly upon the support. A gap is provided between the winding support and the lamination assembly, and the winding support is attached to the machine at its ends.

The known configurations, however, have serious disadvantages, in particular that both in normal operation and in the event of high stresses occurring under short-circuit conditions it is difficult to accommodate these forces, and in consequences the winding support can be destroyed.

The object of the present invention is to provide an improved support arrangement which does not exhibit the disadvantages of known "air-gap" windings.

This object is achieved in that wedges with elastically compressible inserts are arranged around the complete circumference in the gap provided between the inner surface of the stator core, an iron core for example, and the annular winding support.

The advantage of the invention is in particular that when large forces occur, the stator lamination assembly, comprising individual lamination segments held together by retaining bolts, and the winding support, comprising a ring of non-metallic, non-magnetic material, are held together practically rigidly, and during normal operation the winding support is held in a resilient manner, i.e. it can move freely within predetermined limits, and particularly in the radial direction, small vibrations are absorbed by elastically compressible inserts located in the wedges. In the event of deformation which is as great as the predetermined maximum value (as a result of short circuits, faults, etc.) the stress on the winding support is restricted because owing to the arrangement of the wedges, the elastically compressible inserts of which are now compressed, these forces are transmitted to the stator laminations and the deformation is limited by the high stiffness of the lamination assembly.

The bases of the individual wedges are preferably arranged to face one another and a flexible tube is located between the bases of adjacent wedges. By locating a flexible tube between the bases of adjacent wedges facing away from each other air, or a liquid under pressure, can be passed through this flexible tube so that the individual wedges remain wedged in the circumferential direction of the stator between the iron core and the winding support.

It is further proposed that one of the two tapered surfaces of each wedge, preferably the surface facing the rotor, incorporate recesses, to accommodate the elastically compressible inserts, with intermediate projections, and that the elastically compressible inserts and the projections therebetween should be covered with a protective layer. An air gap can also be provided between the protective layer and the surface of the projections. In this manner the protective layer is fixed only to the elastically compressible inserts, preferably by glueing in known manner, while the gap between the protective layer and the projections located between the elastically compressible inserts cannot transmit any vibrations acting on the protective layer to the stator core by way of the wedges.

A preferred embodiment of the invention is illustrated in simplified form in the accompanying drawings, in which.

Figure 1:
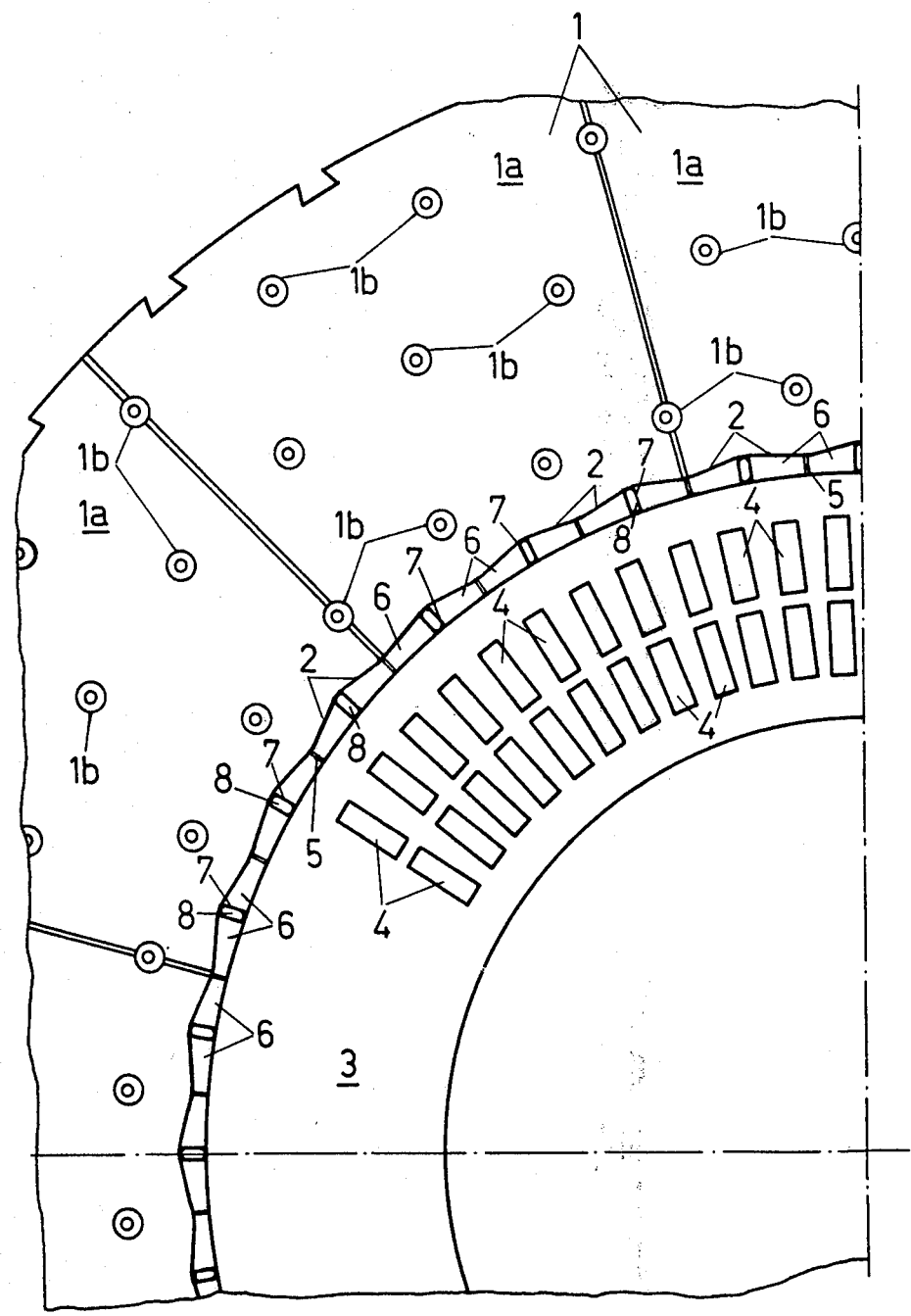
FIG. 1 shows a part of a stator in transverse section.

With reference now to FIG. 1, a stator core 1 is seen to be composed of individual lamination segments 1a held together by retaining bolts 1b, the outer surface of which is cylindrical in shape while its inner surface incorporates "sawtooth-shaped" recesses 2. Between the stator 1 and a winding support 3 of non-metallic, non-magnetic material in the form of a ring and containing winding conductor bars 4, there is a gap 5 in which wedges 6 are located, the wedges being evenly distributed around the entire circumference, and the bases 7 of the wedges being turned towards each other. Between the bases 7 of adjacent wedges 6 a flexible tube 8 filled with air or a liquid is provided, each tube extending over the entire length of the stator 1.

Figure 2:
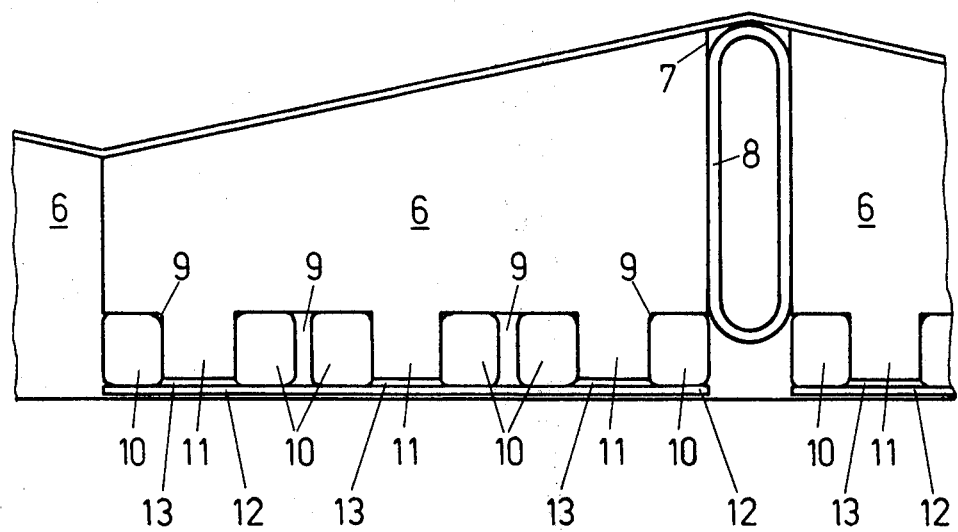
FIG. 2 is a detailed view of the wedge and elastically compressible insert structure drawn to a larger scale.

With reference to the larger scale detail of FIG. 2, the wedges 6 which consist of an insulating material are provided with recesses 9 on their surfaces facing the winding support 3 to accommodate resilient inserts 10 constituted by body members of an elastically compressible material, preferably of rubber of similar material. Between the recesses 9, and uniformly distributed over the surface of the wedges 6, are projections 11 which protrude inwardly toward the winding support ring 3 slightly less than do the resilient inserts 10. The resilient inserts 10 are fixed in the recesses 9, preferably by glueing. The outer surfaces of the elastically compressible inserts 10 facing the winding support ring 3 are covered with a protective layer 12, preferably of a glass-fiber-reinforced synthetic material, and this protective layer 12 is glued to the outer surfaces of these inserts. Since the projections 11 between the recesses 9 protrude inwardly slightly less than do the elastically compressible inserts 10, an air gap 13 is formed between the projections 11 and protective layer 12.

The arrangement of the invention functions in the following manner when the machine, e.g. a generator is in operation.

Depending on the generator load, the radial forces between wedges 6 and winding support 3 compress the elastic inserts 10, and possibly to such an extent that the projections 11 remaining between the recesses 9 containing the elastic inserts 10 come in contact with the protective layer 12, i.e. the air gap 13 is eliminated. If initially the air gap is not equivalent to the deformation of the winding support when the generator is in continuous operation, the elastic inserts 10 will be compressed until the projections 11 and the protective layer 12 come into close contact and the vibrations will cause the protective layer 12 to erode and abrade the projections 11 until a small gap 13 is again created between the projections 11 and the protective layer 12. The size of this gap 13 can be 30 micron, for example, or more. If a short circuit now occurs, the stator can yield only between 30 and 100 micron before the stiffening effect of the stator core 1 intervenes, whereupon the iron core takes up the principal load and limits the stresses in the winding support 3.

I claim:

1. A stator winding support structure for a dynamo-electric machine which comprises an annular support on which conductor bars forming the stator winding are mounted, said annular support being located within a laminated stator core component of the machine and spaced radially therefrom to establish a circumferentially extending gap therebetween, and a circumferential array of wedge means incorporating resilient inserts constituted by body members of an elastically compressible material located in said gap and extending completely around and filling the same for establishing a radially resilient mounting for said annular stator winding support within said stator core.

2. A stator winding support structure as defined in claim 1 for a dynamo-electric machine wherein the bases of adjacent pairs of wedges are arranged so as to face each other.

3. A stator winding support structure as defined in claim 2 for a dynamo-electric machine and which further includes a fluid-filled flexible tube interposed between the bases of adjacent wedges.

4. A stator winding support structure as defined in claim 1 for a dynamo-electric machine wherein said elastically compressible inserts are located in recesses separated by projections therebetween provided along a surface of each wedge.

5. A stator winding support structure as defined in claim 4 for a dynamo-electric machine wherein the elastically compressible insert-containing recesses are provided along the surface of the wedge facing the annular support for the stator winding.

6. A stator winding support structure as defined in claim 5 wherein said elastically compressible inserts and projections are covered by a protective layer.

7. A stator winding support structure as defined in claim 6 wherein an initial air gap exists between the end faces of said projections and said protective layer, said air gap being attributable to the fact that the ends of said elastically compressible inserts facing the protective cover layer extend beyond the ends of said projections.

* * * * *